Figure 1:
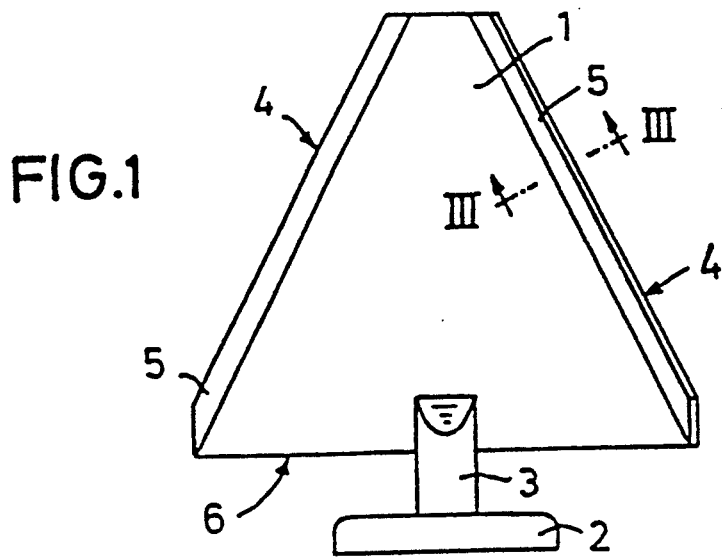

United States Patent [19]

Hjelm

[11] Patent Number: 5,323,728

[45] Date of Patent: Jun. 28, 1994

[54] WARNING SIGN

[75] Inventor: Erik Hjelm, Sangdrosselvej 7, DK-9230 Svenstrup, Denmark

[73] Assignee: Erik Hjelm, Svenstrup, Denmark

[21] Appl. No.: 969,269

[22] PCT Filed: Jun. 24, 1991

[86] PCT No.: PCT/DK91/00173

§ 371 Date: Jan. 11, 1993

§ 102(e) Date: Jan. 11, 1993

[87] PCT Pub. No.: WO92/00864

PCT Pub. Date: Jan. 23, 1992

[30] Foreign Application Priority Data

Jul. 10, 1990 [DK] Denmark ............... 1655/90

[51] Int. Cl.⁵ ............... E01F 9/10; G09F 7/02
[52] U.S. Cl. ............... 116/63 T; 40/600; 40/602
[58] Field of Search ............... 116/63 T, 63 P, 209, 116/28 R; 40/592, 602, 600, 607

[56] References Cited

U.S. PATENT DOCUMENTS

| 3,292,569 | 12/1966 | Trigilio | 116/63 P |
| 3,758,190 | 9/1973 | Douglas . | |
| 4,329,800 | 5/1982 | Shuman | 40/607 X |
| 4,403,565 | 9/1983 | Bleiweiss et al. | 116/63 T |
| 4,548,379 | 10/1985 | Seely et al. | 40/602 X |
| 4,633,215 | 12/1986 | Anders et al. | 40/592 X |
| 4,798,017 | 1/1989 | Giotis | 40/602 X |
| 4,805,550 | 2/1989 | Raczkowski et al. | 116/63 T |
| 4,806,024 | 2/1989 | Tanaka . | |

FOREIGN PATENT DOCUMENTS 0352386 1/1990 European Pat. Off. .
1191069 5/1970 United Kingdom .

Primary Examiner—Daniel M. Yasich
Attorney, Agent, or Firm—Lee, Mann, Smith, McWilliams, Sweeney & Ohlson

[57] ABSTRACT

A triangular warning sign (1) is mounted in a rotatable manner via a shaft (3) in a foot (2), in that two side edges (4) on the sign (1) facing away from the foot (2) are bent to provide flanges (5). The flanges (5) face in mutually opposite directions, whereby the sign (1) when used outdoors can be influenced by the wind and rotate. The sign (1) thus becomes visible from all sides.

4 Claims, 3 Drawing Sheets

WARNING SIGN

The invention relates to a warning sign, substantially triangular in shape and provided with a supporting foot as disclosed in the preamble to claim 1.

A sign of such a type is used in traffic, and must be carried by motor vehicles so that in the event of breakdown or accident with the vehicle, it can be positioned behind the vehicle in order to avoid other vehicles running into the stationary vehicle.

However, the known signs have the disadvantage that they are visible from only one side. If an accident has occurred at a place in which the traffic is coming from several sides, the sign is not visible from some of the sides. Moreover, it is desirable to be able to mark the place more clearly in the dark, in that reflections from wet road surfaces, street lights etc. will often make the sign easy to overlook.

The object of the invention is to present a warning sign which can be seen more easily from several sides in a relatively simple manner.

This is achieved by making the signpost rotatable in the foot, and by making the actual sign plane and providing the two side edges facing away from the post with two flanges which extend mutually opposite in relation to the main plane of the sign. The main plane is one which is parallel with the sign surface or surfaces which bear the warning symbol or the warning information.

The sign can thus rotate under the influence of the wind, which in daylight means that the sign is presented to all sides, and in the dark that a flashing effect is produced by reflection of the light from a vehicle in the warning colours and/or the sign's reflective coating, which makes the sign considerably easier to see.

A simple and advantageous embodiment from the production point of view is disclosed in claim 2.

By providing the foot with a magnet, the sign can, for example, be secured on the roof of a car, which can be of great significance for the sign's visibility when there is snow along the roadside or other obstructions which prevent it from being seen along the ground.

In order to avoid the costs of a ball bearing, and to make production cheaper, it is preferred that the sign be configured as disclosed in claim 4, where the connection between the post and the foot is in the form of a snap connection on the end of the post, which can enter into engagement with an annular groove in the foot.

Figure 2:
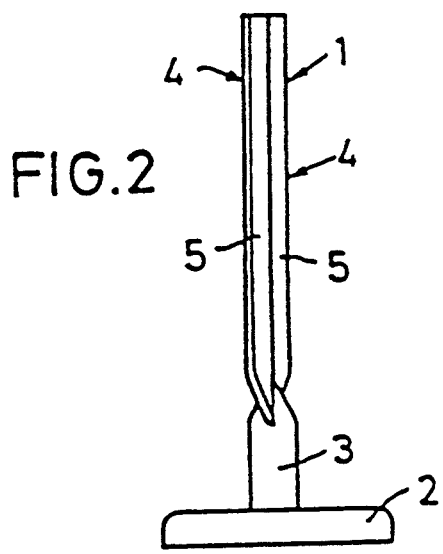
Figure 3:
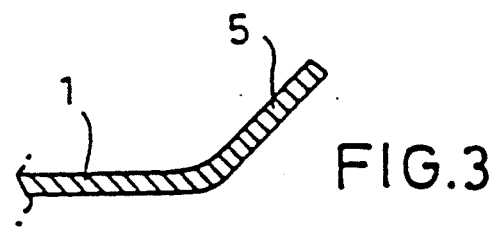
Figure 4:
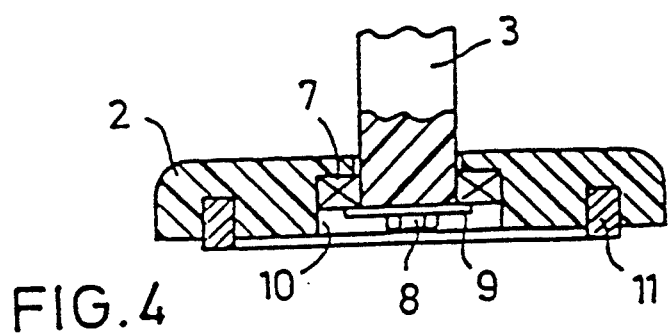
Figure 5:
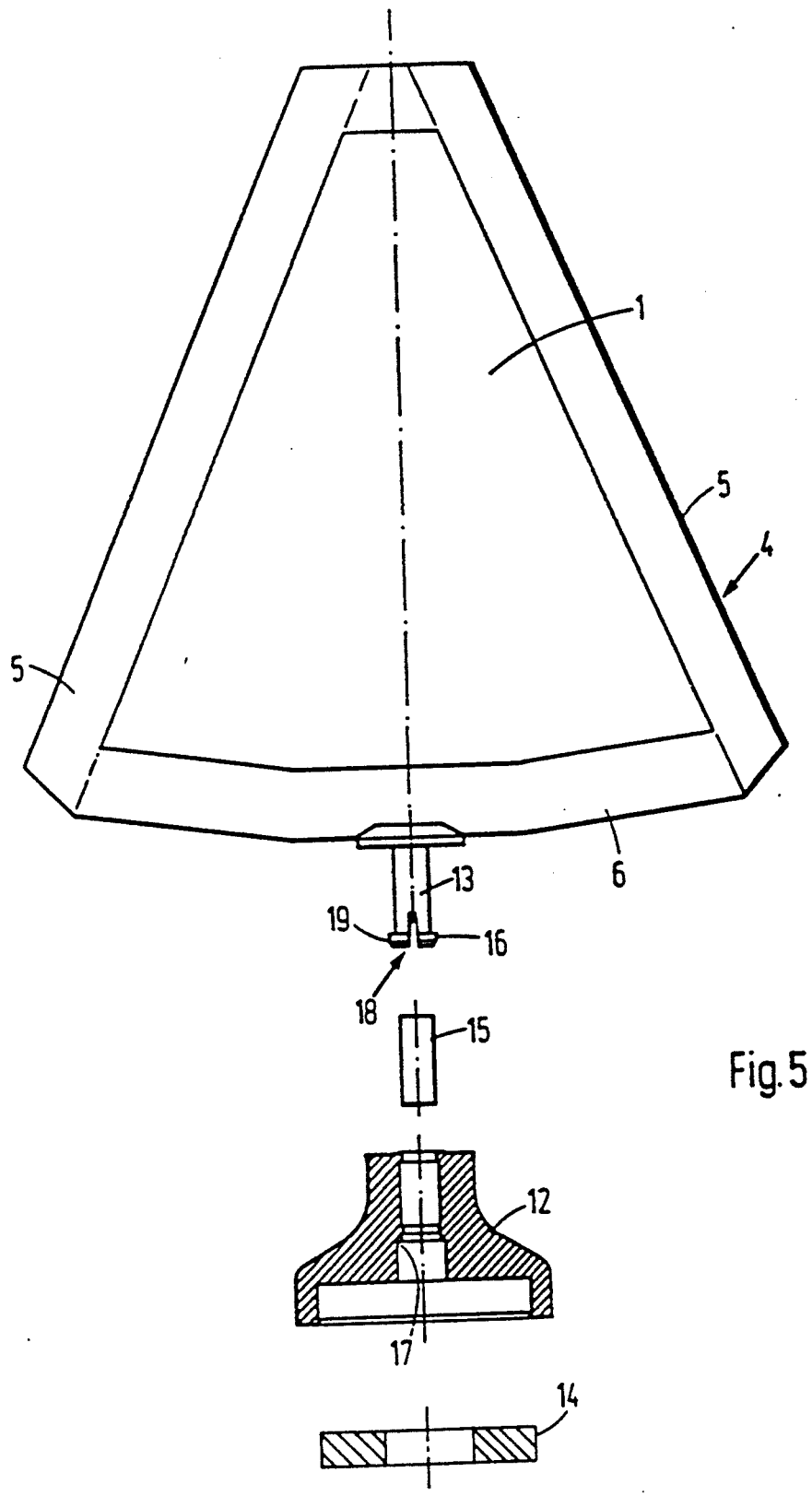
Figure 6:
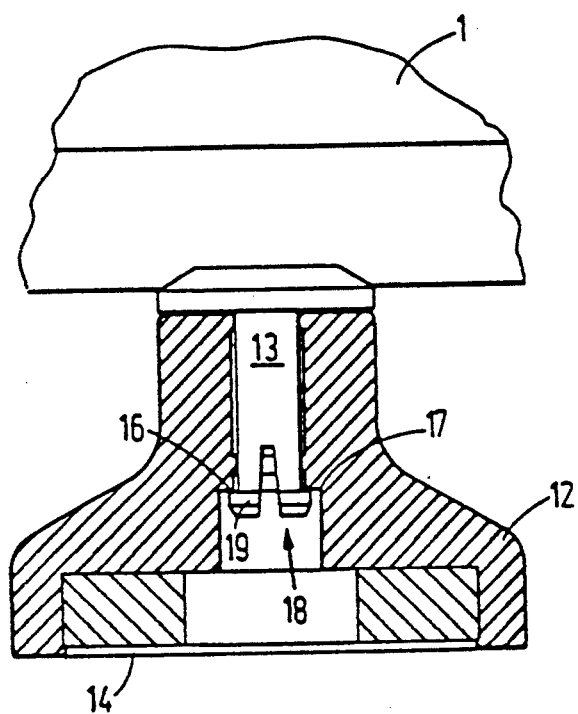

Examples of embodiments of the invention will now be described in more detail with reference to the drawing, where FIG. 1 shows a first embodiment of the warning sign according to the invention in the form of a warning triangle seen at right-angles to the main plane of the sign, FIG. 2 shows the same as in FIG. 1, but parallel with the main plane and from the side, FIG. 3 shows a section along the line III—III in FIG. 1, FIG. 4 shows a cross-section through the foot of the warning sign, FIG. 5 shows an exploded drawing of a second embodiment of the invention, and FIG. 6 shows an enlarged detail section of the foot of the second embodiment in the assembled condition.

The warning triangle consists of a sign 1, a foot 2 and a shaft or holder 3.

The actual sign 1 can be built-up of laminated or injection-moulded synthetic material, and on both sides be provided with reflective foil in colours, so that a red triangle with white centre part is formed. Along two of the side edges 4 of the sign 1 there are bent flanges 5 which extend at an angle in relation to the main plane of the sign 1, in that the flanges 5 face in opposite directions in relation to the main plane. The angle in relation to the main plane is 45 degrees, but other angles can naturally be selected within the scope of the patent claims. Moreover, the flanges 5 do not need to be plane or straight as shown in FIG. 3, but can consist of curved pieces.

At a third side edge of the sign 1 there is secured a shaft or holder 3 which, in the preferred embodiment, consists of a cylindrical piece of synthetic material. The holder 3 is housed in a rotatable manner in a ball bearing 7 in the foot, in that the holder 3 is secured to the inner ring of the bearing 7 by a screw 8 and washer 9. The actual bearing 7 sits firmly in the foot 2 by interference fit in a recess 10.

The axis of rotation for the sign which is formed by the bearing 7 extends substantially at right-angles to the side edge 6.

In order for the sign to be secured in a high place, for example on the roof of a car, the foot is provided with an annular magnet 11 which is pressed into the bottom of the foot 2. In addition to making the sign more conspicuous, it can hereby be avoided that the warning triangle is more or less concealed by Snow on the ground or sprayed with dirt by passing vehicles.

The warning sign according to the invention can naturally also be placed on a long post as an intermediate link for or in place of the holder 3, and hereby lift the sign 1 up over ground level.

A second preferred embodiment of the invention, though with the same configuration of flanges 5, is shown in FIGS. 5 and 6. With this embodiment, the side edges 4 are 1.1 to 1.2 times longer than the third side edge 6.

Here, a round holder or journal 13 of injection-moulded plastic is provided with a snap connection in the form of a slotted end part 18, which has a portion 19 with increased diameter and sharp-edged collar 16, and with a truncated cone-shaped end.

The foot 12, which is also made of injection-moulded plastic, is provided with an annular recess 17 which can receive the collar 16, see FIG. 6. A metal tubular bush 15, slide bearing is formed by a metal which is not shown in FIG. 6, which sits between the foot 12 and the gudgeon 13 to provide for wearing qualities and minimum friction.

As in the first embodiment, the magnet 14 is pressed into the foot 12. Moreover, the magnets can be of widely different geometric shapes.

Other embodiments of the warning sign according to the invention are possible within the scope of the patent claims.

I claim:

1. Warning sign comprising a substantially triangular sign having opposite planar side surfaces and a plurality of side edges, said triangular sign being secured to a post which extends at right-angles in relation to a first side edge of the triangular sign, and substantially in extension of the side surfaces, and comprising a foot, the post being mounted in a rotatable manner to the foot for rotation under the influence of the wind, and the triangular sign being provided with bent flanges adjacent second and third side edges of the triangular sign, said flanges extending in mutually opposite directions in relation to the side surfaces of the triangular sign, each flange being plane and extending substantially along the whole length of the adjacent side edge and parallel to the adjacent side edge of the triangular sign.

2. Warning sign according to claim 1, in which the foot includes a top side from which the post extends and an opposing bottom side, and in which a magnet is provided in the bottom side of the foot.

3. Warning sign according to claim 2, including means for snap connecting the post to the foot, said snap connection means being shaped to enter into engagement with an annular recess in the foot.

4. Warning sign according to claim 1, including means for snap connecting the post to the foot, said snap connection means being shaped to enter into engagement with an annular recess in the foot.

* * * * *